Dec. 22, 1959 E. J. CASEY 2,918,577

WIDE BAND DISCRIMINATOR

Filed Dec. 3, 1957 2 Sheets-Sheet 1

INVENTOR,
EDWARD J. CASEY

BY
Harry M. Saragovitz
ATTORNEY.

WIDE BAND DISCRIMINATOR

Filed Dec. 3, 1957 2 Sheets-Sheet 2

INVENTOR,
EDWARD J. CASEY
BY
Harry M. Saragovitz
ATTORNEY

United States Patent Office 2,918,577

Patented Dec. 22, 1959

2,918,577

WIDE BAND DISCRIMINATOR

Edward J. Casey, Minneapolis, Minn., assignor, by mesne assignments, to the United States of America as represented by the Secretary of the Army

Application December 3, 1957, Serial No. 700,529

3 Claims. (Cl. 250—27)

Figures 1, 1A:
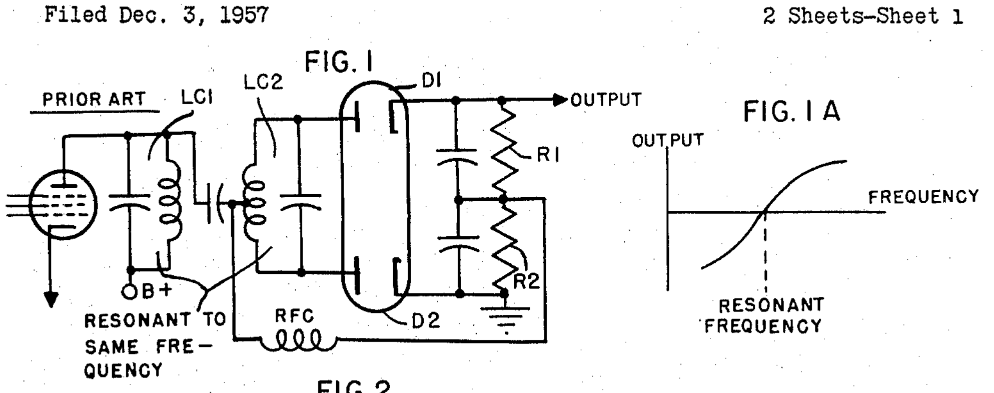

The invention relates to frequency responsive networks and particularly to wide-band frequency discriminating networks for use in communication or other signal frequency transmission systems.

More specifically, the invention is directed to such networks used with signals of finite bandwith, such as noise signals comprising a relatively wide band of frequency components.

A general object of the invention is to improve such networks from the standpoints of accuracy and linearity of frequency response, sensitivity and stability.

Another object is to convert signals of varying frequency into amplitude-modulated signals.

A more specific object is to produce accurate indications of the deviation of the center frequency of the power spectrum of signals of finite bandwith, such as noise signals, from a desired frequency.

These objects are attained in accordance with the invention by a special type of discriminating network which, when noise or other signals of finite bandwith are supplied to its input, is adapted to detect and indicate accurately the deviations from a certain frequency of the center frequency of the signal power spectrum, i.e., a Gaussian distribution around any given noise-spectrum frequency $f_c$, over a relatively wide frequency range, It accomplishes this by developing in the output of the network a D.C. error voltage the amplitude of which varies almost linearly with the frequency deviation over this range. In one embodiment, the network includes a multi-winding input transformer having a single primary winding on which the noise or other signals of finite bandwith are impressed and a plurality of secondary windings coupled to respectively different sections of the primary winding so as to provide in effect, a plurality of input transformers; at least three diode rectifiers and associated resonant circuits respectively tuned to slightly different frequencies above and below the desired center frequency of the power spectrum of the impressed signals, respectively including different secondary windings of the input transformer or transformers; a plurality of load resistors respectively fed with the rectified signal output of a different one of the diode rectifiers; and an output circuit connected across all of the load resistors in series, for taking off therefrom a D.C. error voltage varying with frequency. Fixed value capacitors in the resonant circuits and variable capacitors connected across these circuits are respectively utilized for coarse and fine tuning adjustments of the discriminator. The discriminator network may also include resistors connected directly across certain secondary windings only of the input transformer, utilized to broaden the frequency response of the network by effectively damping the Q of certain of the tank circuits, and smoothing or filtering capacitors connected across the load resistors to provide a long time constant for the discriminator output circuit so that sudden variations in output are leveled or averaged out in that circuit.

The main advantage of the discriminating network of the invention as above described resides in the linearity and accuracy of its frequency response for input signals of finite bandwith, rather than those of zero bandwith, which are necessary since the ordinary technique of input signal limiting cannot be used here to recover the information content of the noise signals. Accuracy and stability are other advantageous features of the discriminating network of the invention.

Figure 3:
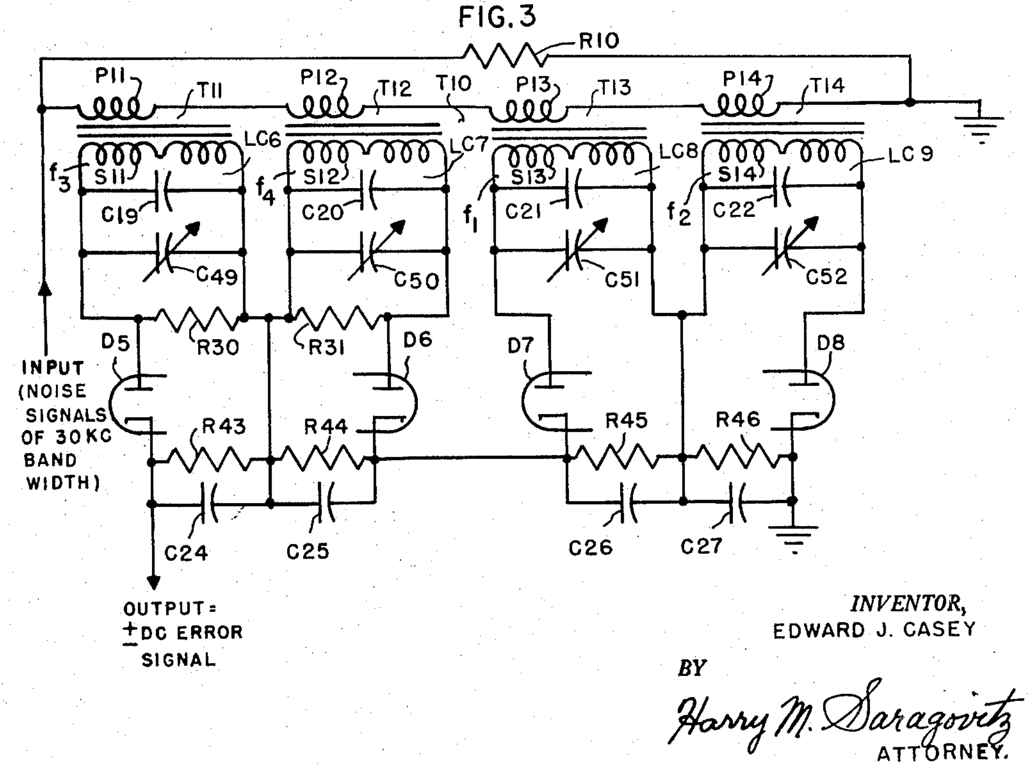

The various objects and features of the invention will be better understood from the following complete description thereof when it is read in conjunction with the several figures of the accompanying drawings in which:

Figures 1 and 1A, and Figures 2 and 2A, respectively show schematically the circuits and frequency-voltage output characteristics of different types of prior art discriminators employing diode rectifiers;

Figure 3 shows schematically the circuit diagram of one embodiment of an improved frequency discriminating network in accordance with the invention; and Figures 4 to 7 show curves used to explain the operation of and the improved results obtainable with the frequency discriminator of the invention shown in Figure 3.

In radio and radar receiving circuits requiring the detection of and operation with varying frequency signals, it is often necessary to employ discriminators to convert frequency-modulated signals to amplitude-modulated signals. The circuit of one widely used discriminator for this purpose is shown in Figure 1. As shown, it employs a double diode D1, D2 so interconnected with other circuit elements that it produces an output voltage which is the difference of the rectified outputs of the individual diodes in response to impressed input signals. In this circuit, excitation is obtained through two coupled inductance coil-condenser circuits LC1 and LC2 resonant to the same frequency, on which the frequency-modulated signal wave is impressed; for input frequencies slightly off resonance the RF voltage applied to the anode of one of the diode rectifiers will be larger and that applied to the anode of the other diode rectifier will be smaller, with the result that the differential output voltage taken off the capacitively-shunted load resistors R1 and R2 connected in series between the cathodes of the two diode rectifiers will vary almost linearly with frequency, as shown by the curve of Figure 1.

Figure 2:
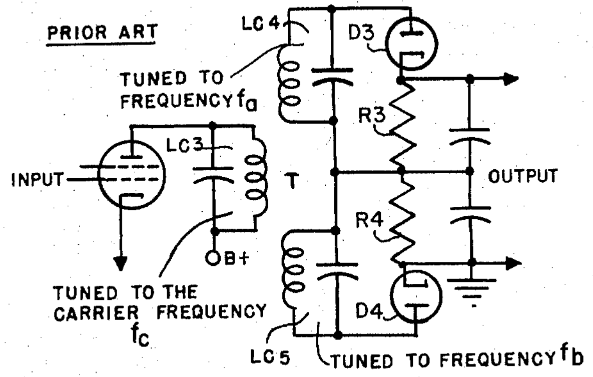
Figure 2A:
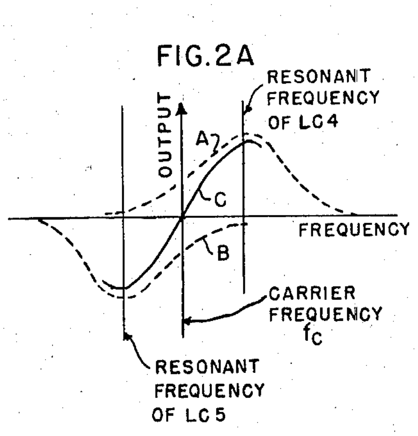

The circuit diagram of another commonly used discriminator network of the diode type is shown in Figure 2. As shown, it employs an input transformer T having a single primary winding shunted by a capacitor to form a resonant circuit LC3 tuned to the carrier frequency $f_c$ of the modulated signals applied thereto, and two secondary windings forming with the capacitors connected in shunt therewith the two resonant circuits designated LC4 and LC5 respectively tuned to a frequency $f_a$ slightly above the carrier frequency and a frequency $f_b$ slightly below the carrier frequency. With this arrangement, each diode rectifier D3 or D4 respectively connected in series with a capacitively shunted load resistor R3 or R4 across the resonant circuit LC4 and the resonant circuit LC5, respectively, develops across the load impedance a voltage that varies with frequency, as shown by the dotted curves A and B, respectively, in Figure 2A, and the output voltage taken across these two load impedances in series, as shown by the solid line curve designated C in Figure 2A, is the difference of these two voltages, and is substantially linear over a certain range of frequencies.

Figure 3 shows the circuit diagram of an improved frequency discriminating network in accordance with the invention for producing a D.C. error voltage for any variation from a reference frequency of the center frequency of the power spectrum of noise or other signal waves of finite bandwidth impressed on the network. As shown, this network includes input transformers T11, T12, T13, T14 . . . having respective primary windings P11, P12, P13, P14 . . . serially connected and shunted by a common resistor R10, and a corresponding number of separate secondary windings S11, S12, S13, S14 . . . respectively coupled to a different one of the series-connected primary windings.

Figure 7:
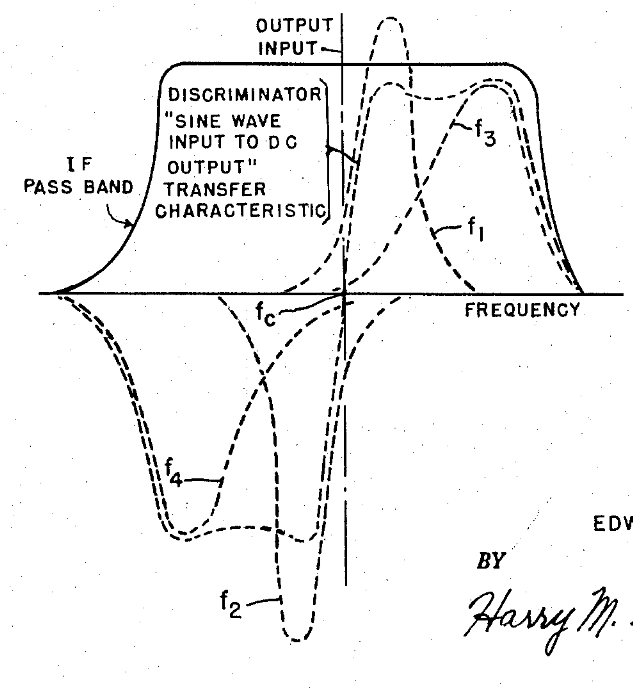

The noise signals of finite bandwidth, say 30 kilocycles per second, are applied to the primary side of the input transformers T11 to T14 as shown. Individual capacitors C19, C20, C21, C22 . . . of selected fixed values are respectively connected in shunt with a different one of the secondary windings S11, S12, S13, S14 . . . forming therewith separate resonant circuits LC6, LC7, LC8, LC9 . . . the inductance and capacitance values of the circuit elements in these circuits being proportioned so that these resonant circuits are respectively tuned to one of the slightly different frequencies $f_3$, $f_4$, $f_1$, $f_2$ . . . above and below the desired center frequency of the power spectrum of the input signal; that is, these individual resonant circuits are stagger-tuned about a center frequency $f_c$, as shown in Figure 7. The selected values of the fixed value capacitors C19, C20, C21, C22 . . . provide coarse tuning adjustments of the discriminator network. The variable capacitors C49, C50, C51, C52 . . . respectively connected in shunt of the resonant circuits LC6, LC7, LC8, LC9 . . . provide means for fine tuning adjustments of the discriminator network. For example, for a center frequency of, say, 6 kc., the capacitor C51 would be adjusted to give a maximum output at a frequency of 5.9 kc., capacitor C52 would be adjusted to give a maximum output at a frequency of 6.1 kc., and capacitors C49 and C50 would in like manner be adjusted to give a maximum output at a frequency of 5.65 kc. and 6.35 kc., respectively.

Two of the resonant circuits, say LC6 and LC7, have resistors R30 and R31, respectively connected directly across their secondary windings S11 and S12 in order to broaden the response curve by effectively damping the Q of the tank circuits. The diodes D5, D6, D7, D8 . . . are respectively connected directly in series with the secondary windings S11, S12, S13, S14 . . . of the input transformers T11, T12, T13, T14 . . . respectively; and the load-resistors R43, R44, R45, R46 . . . are respectively connected in shunt with these same windings at points in the outputs of the respective diodes D5, D6, D7, D8 . . . . The diodes act as rectifiers and their rectified outputs produce a D.C. error voltage across the several load resistors R43, R44, R45, R46 . . . in series, the amplitude of which varies with the deviation of the center frequency of the power spectrum of the noise signal from the desired frequency. The fixed value capacitors C24, C25, C26, C27 . . . respectively connected in shunt with the load resistors R43, R44, R45, R46 . . . act as smoothing or filtering capacitors and provide a long time constant for the output circuit of the discriminating network for leveling or averaging out any sudden variations in the output voltage due to transients.

Figures 4, 5, 6:
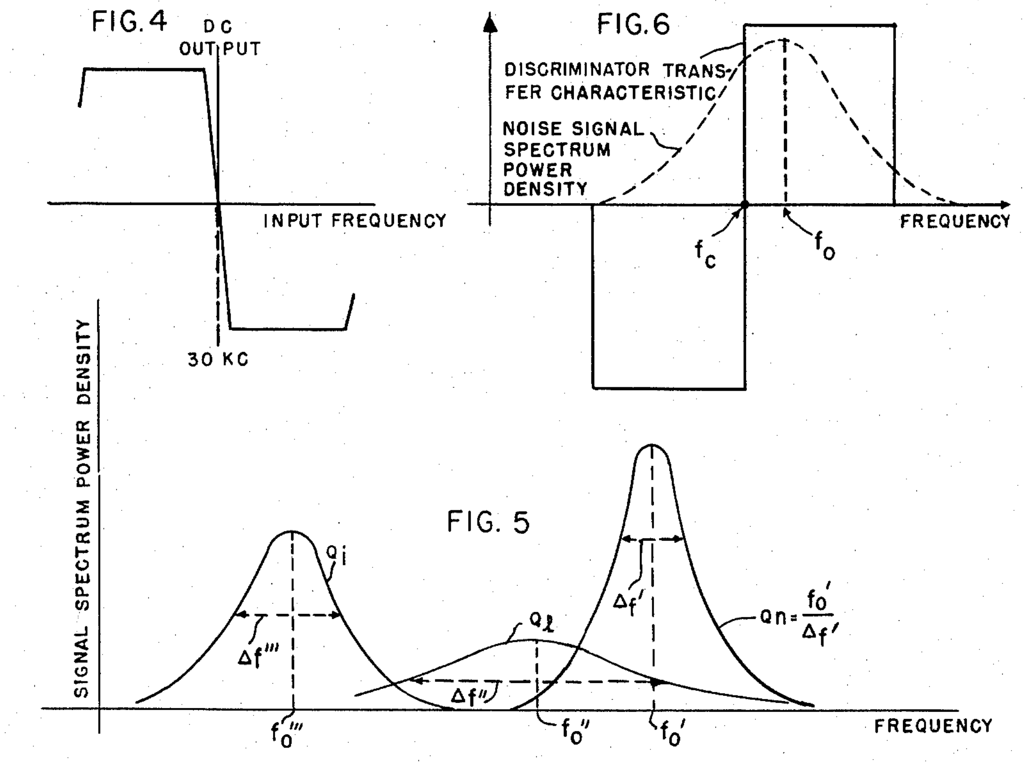

When the amplitude of the D.C. error voltage produced by the type of discriminating network shown in Figure 3 is plotted against sine-wave, input-frequency signal-deviation (considering the signal deviation as though it were a noise spectrum signal of constant R.M.S. and zero-bandwidth), the output response curve will be approximately as shown in Figure 4. It will be noted in that figure that the central portion of the waveform at the desired center frequency (here 30 kc.) is practically linear and straight up-and-down. This means that the discriminator would be extremely sensitive to deviations from the center frequency of a sine wave-input signal.

The transfer characteristic of the discriminator network of Figure 3 and that of the preceding IF bandpass filters (not shown) are best shown graphically (Fig. 7) by their response to sine wave (zero bandwidth) signals, but the main advantage of this network lies in its response when finite-bandwidth noise signals are impressed on it. The symbols used in connection with a description of the curves of Figures 4 to 7 are defined as follows:

Noise power spectrum—a gaussian distribution around any given noise-spectrum center-frequency $f_o$ (approx.).

$(\Delta_f', \Delta_f'', \Delta_f''')$=noise spectrum bandwidth between 3 decibel points.

$Q=f_o/\Delta_f$ (measure of noise signal or "percentage bandwidth").

The curves of Figure 5 indicate the nature of the noise signals impressed on the input of the discriminating network of Figure 3. This figure is intended to indicate several constant-R.M.S.-value signals of different Q-values; in this figure, $Q_h$=highest $Q$=200 (approx.).
$Q_l$=lowest $Q$=5 (approx.).
$Q_i$=any intermediate noise signal-power spectrum characteristic.

The conventional IF band-pass characteristics, the sine wave-transfer characteristics of the discriminator and the "D.-C. output with sine-wave input" characteristics of the individual tuned circuits (LC6, LC7, LC8, LC9) are indicated by the curves of Figure 7 respectively designated by the frequencies $f_3$, $f_4$, $f_1$, $f_2$ to which these circuits are tuned staggered about the desired center frequency $f_c$ of the power spectrum of the applied signals. Idealizing the "discriminator" curve of Figure 7 and indicating with an overlay of a medium-Q noise signal on the idealized discriminator transfer characteristic, results in the curves of Figure 6.

The special discriminator transfer characteristic operating on this "finite-bandwidth" input signal will yield an output versus $f_o$ (the noise spectrum-center frequency) characteristic very similar to what an ordinary discriminator, such as that of Figure 1 or Figure 2, yields to a sine wave-input signal. The modified discriminator network of Figure 3 was used as one element in a feedback loop (electronic servomechanism) system, and the fairly linear output voltage resulting as a function of $(f_o-f_c)$ when $f_o$ was in the region of $f_c$, was largely responsible for the improved accuracy and stability of that system.

It is to be noted that, whereas all of the information in the ordinary use of discriminators in FM reception is in the frequency of the input signal, thus permitting input signal limiting to be used therein, the information content of input "noise signals" is in the power spectrum. The amplitude variation of the noise signal contains much of this power spectrum information, so that noise input signals applied to the input of the discriminator of the invention shown in Figure 3, would have the usual "rule of thumb" peak-to-peak root mean square (R.M.S.) ratio of 5:1 maintained in the input signal amplifiers (not shown in Figure 3).

To obtain still more rectangular discriminator transfer characteristics than shown in Figure 7, six or eight or more resonant circuits and a corresponding number of diode rectifiers could be used in a system of the general type in accordance with the invention shown in Figure 3, although this change might make the circuit tuning, circuit Q-control and error signal-amplitude control somewhat more difficult. Other changes in the improved discriminator circuit illustrated and described above which would be within the spirit and scope of the invention will occur to persons skilled in the art.

What is claimed is:

1. A frequency discriminating network for use with a signal wave of finite bandwidth for indicating accurately the deviation of the center frequency of the power spectrum of that wave, including an input circuit for receiving said wave, a plurality of input transformers having respective serially connected untuned primary windings connected to said input circuit and respective secondary windings respectively coupled to a different one of said primary windings, a plurality of capacitors one or more of which are connected across a different one of each of said secondary windings to form therewith a different resonant circuit, the capacitance value of each capacitor and the inductance value of the secondary winding in each of said resonant circuits being relatively proportioned so that these circuits are tuned to slightly different frequencies staggered about the desired center frequency of the power spectrum of said signal wave, at last three diode rectifiers, a different load resistor for each of the rectifiers, each diode rectifier and its associated load resistor being connected in series across a different one of said resonant circuits so as to be supplied with the particular frequency band-portion of the signal wave selected thereby, said diode rectifiers being poled so that each produces an output voltage of the same polarity in response to the supplied signal wave portion, and an output circuit connected across all of the load resistors in series for taking off therefrom a D.C. error voltage varying in amplitude in accordance with the deviation of the center frequency of the power spectrum of the signal wave received by said input circuit from the desired frequency.

2. The frequency discriminating network of claim 1, in which another capacitor acting as a smoothing or filtering capacitor is connected across each of said load resistors to provide a long time constant for said output circuit which will result in the leveling or averaging out of sudden variations of output voltage due to transients.

3. A discriminator network for providing accurate indication of the deviation from a desired frequency of the center frequency of the power spectrum of noise signals of finite frequency bandwidth, said network comprising an input circuit to which said noise signals are applied, a plurality of input transformers having respective untuned primary windings connected in series with each other across said input circuit, and respective secondary windings respectively coupled to a different one of said primary windings, a plurality of fixed value capacitors respectively connected across each of said secondary windings and forming therewith separate resonant circuits which by suitable proportioning of the inductance and capacitance therein are respectively tuned to slightly different frequencies above and below said desired frequency, a variable capacitor of selected nominal value connected across each of said resonant circuits, at least three diode rectifiers and a different load resistor for each of said rectifiers, one of said rectifiers and its associated load resistor being connected in series across each of said resonant circuits so as to be supplied with the signal portion selected thereby, said diode rectifiers being poled so that each produces a voltage output of the same polarity in response to the supplied signal portion, another resistor connected across each of certain of said resonant circuits only, utilized to effectively broaden the frequency response of said network by damping the Q of these circuits, and output circuit connected across all of said load resistors in series, for taking off therefrom a D.C. error voltage whose amplitude varies almost linearly with the frequency deviation of the center frequency of the power spectrum of said noise signals from said desired frequency and means for leveling or averaging out from said error voltage sudden output variations due to transients, the fixed value capacitors in said resonant circuits and the variable capacitors connected thereacross being utilized to provide coarse and fine tuning adjustments, respectively, for said discriminator network.

References Cited in the file of this patent

UNITED STATES PATENTS

| | | |
|---|---|---|
| 2,368,643 | Crosby | Feb. 6, 1945 |
| 2,423,229 | Crosby | July 1, 1947 |
| 2,771,552 | Lynch | Nov. 20, 1956 |